United States Patent [19]

Armstrong

[11] Patent Number: 5,254,264
[45] Date of Patent: Oct. 19, 1993

[54] METHOD OF DISPENSING A SUBSTANCE INTO A FLOW OF WATER

[76] Inventor: Duncan Armstrong, 4 Falmouth Ct., Mt. Sinai, N.Y. 11766

[21] Appl. No.: 813,484

[22] Filed: Dec. 26, 1991

[51] Int. Cl.⁵ .............................................. C02F 5/08
[52] U.S. Cl. ................................... 210/696; 210/198.1; 210/697; 184/55.2; 422/264; 427/239
[58] Field of Search ................. 210/696-701, 210/198.1, 205, 206, 239; 184/55.2; 422/264, 283; 222/1; 427/239

[56] References Cited

U.S. PATENT DOCUMENTS

| | | | |
|---|---|---|---|
| 2,566,469 | 9/1951 | Tea et al. | 137/591 |
| 2,604,446 | 7/1952 | Palmer | 422/283 |
| 2,885,271 | 5/1959 | Kersh | 210/206 |
| 3,169,110 | 2/1965 | Rudelick | 210/191 |
| 3,349,915 | 10/1967 | Fleckensteing | 210/191 |
| 3,411,609 | 11/1968 | German | 184/55.2 |
| 3,605,949 | 9/1971 | Vock | 184/55.2 |
| 3,772,901 | 11/1973 | Ferraro | 210/206 |
| 3,934,600 | 1/1976 | Murphy | 137/2 |
| 3,951,802 | 4/1976 | Derouineau | 210/191 |
| 3,958,635 | 5/1976 | Zilch et al. | 422/15 |
| 4,104,158 | 8/1978 | Davis | 210/139 |
| 4,181,605 | 1/1980 | Braswell | 210/191 |
| 4,295,545 | 10/1981 | Hiei | 184/55.2 |
| 4,347,224 | 8/1982 | Beckert et al. | 210/198.1 |
| 4,732,389 | 3/1988 | Harvey et al. | 422/283 |
| 4,737,275 | 4/1988 | Franks | 210/190 |
| 4,807,721 | 2/1989 | Fujiwara | 184/55.2 |
| 4,855,043 | 8/1989 | Dalton | 210/190 |

Primary Examiner—Peter Hruskoci
Assistant Examiner—Robert James Popovics
Attorney, Agent, or Firm—Nolte, Nolte & Hunter

[57] ABSTRACT

A method of dispensing scaling inhibitors into a flow of low pressure water by modifying the use of available air lubricators. Mechanical modifications to an air lubricator results in an apparatus capable of dispensing a scaling inhibitor into a water flow of only 0.24 liters per minute.

5 Claims, 3 Drawing Sheets

METHOD OF DISPENSING A SUBSTANCE INTO A FLOW OF WATER

BACKGROUND OF THE INVENTION

This invention relates to an improved apparatus for dispensing scaling inhibitors into a stream of very low pressure water. This invention also relates to the method of making this dispensing unit by converting commercially available air lubricators.

The prior art generally refers to electromechanical injection systems and ion-exchange resins. These systems are generally complex and, in the case of resins, require recharging at intervals. The present invention makes use of a modified Venturi tube and the Bernoulli effect to inject a scaling inhibitor into a very low pressure trickle of water, generally on the order of only two pounds of pressure per square inch. Devices on the market designed to treat water at these low pressures usually resort to first passing the water flow into a reservoir and dripping the sealing inhibitor into the reservoir with a pump. The present invention requires no moving parts.

OBJECTS OF THE INVENTION

It is an object of this invention to provide a means of dispensing a scale inhibitor into a stream of low or very low pressure water without the use of pumps or ion exchange resins.

It is a further object of this invention to create an apparatus for injecting a substance into a stream of low or very low pressure water by modifying commercially available air lubricators, thereby minimizing cost and effort.

DETAILED DESCRIPTION OF THE DRAWINGS

Figure 1:
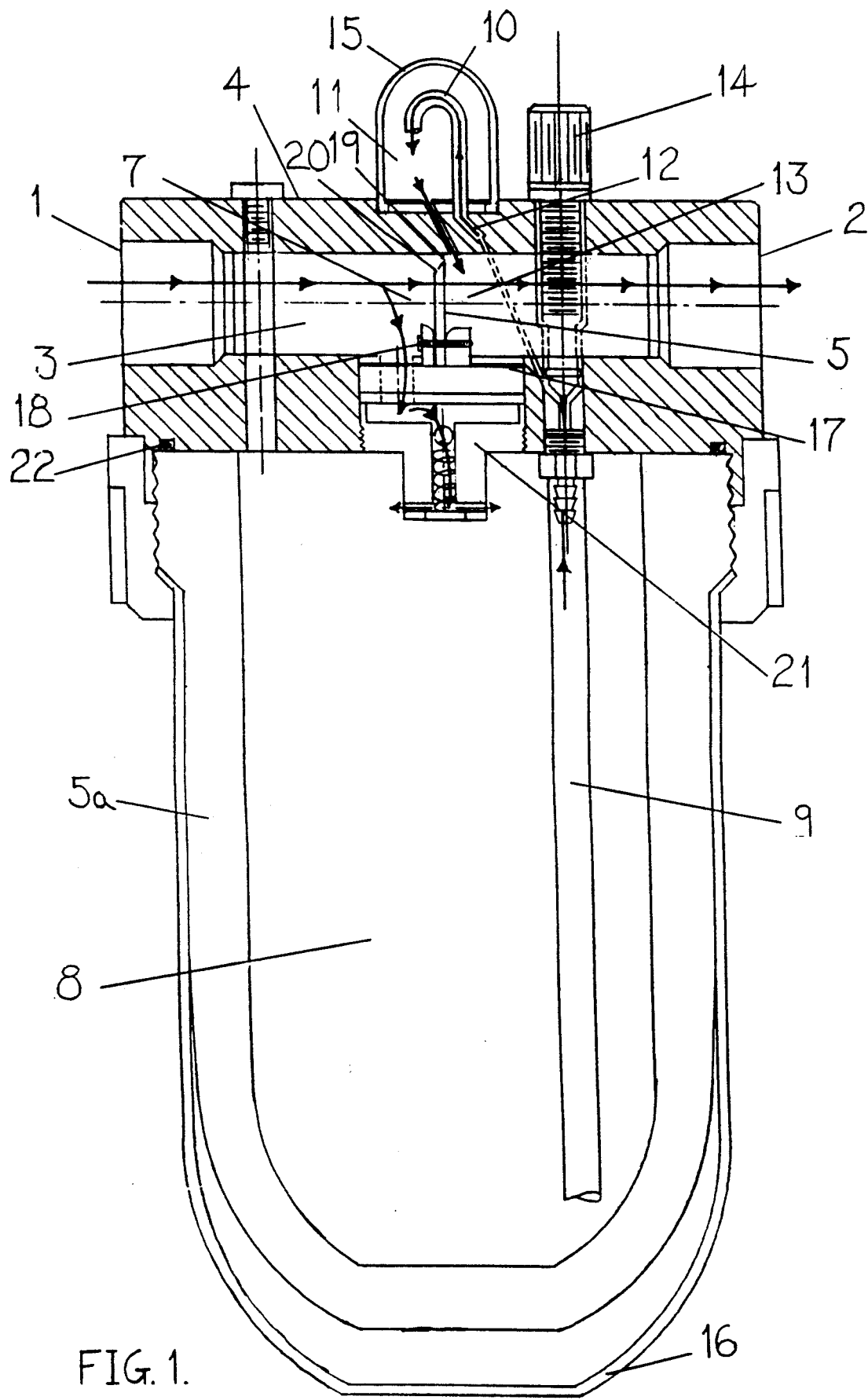
FIG. 1 depicts a cross-sectional view of a representative air lubricator.
Figure 2:
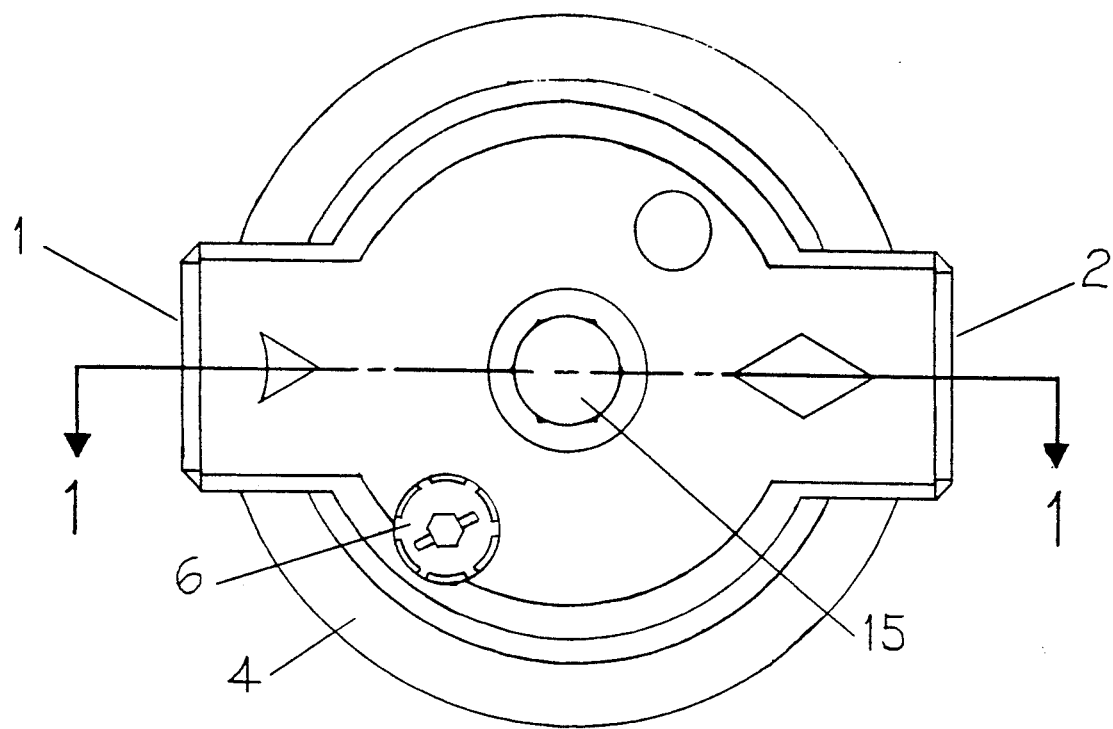
FIG. 2 depicts a top plan view of FIG. 1.
Figure 3:
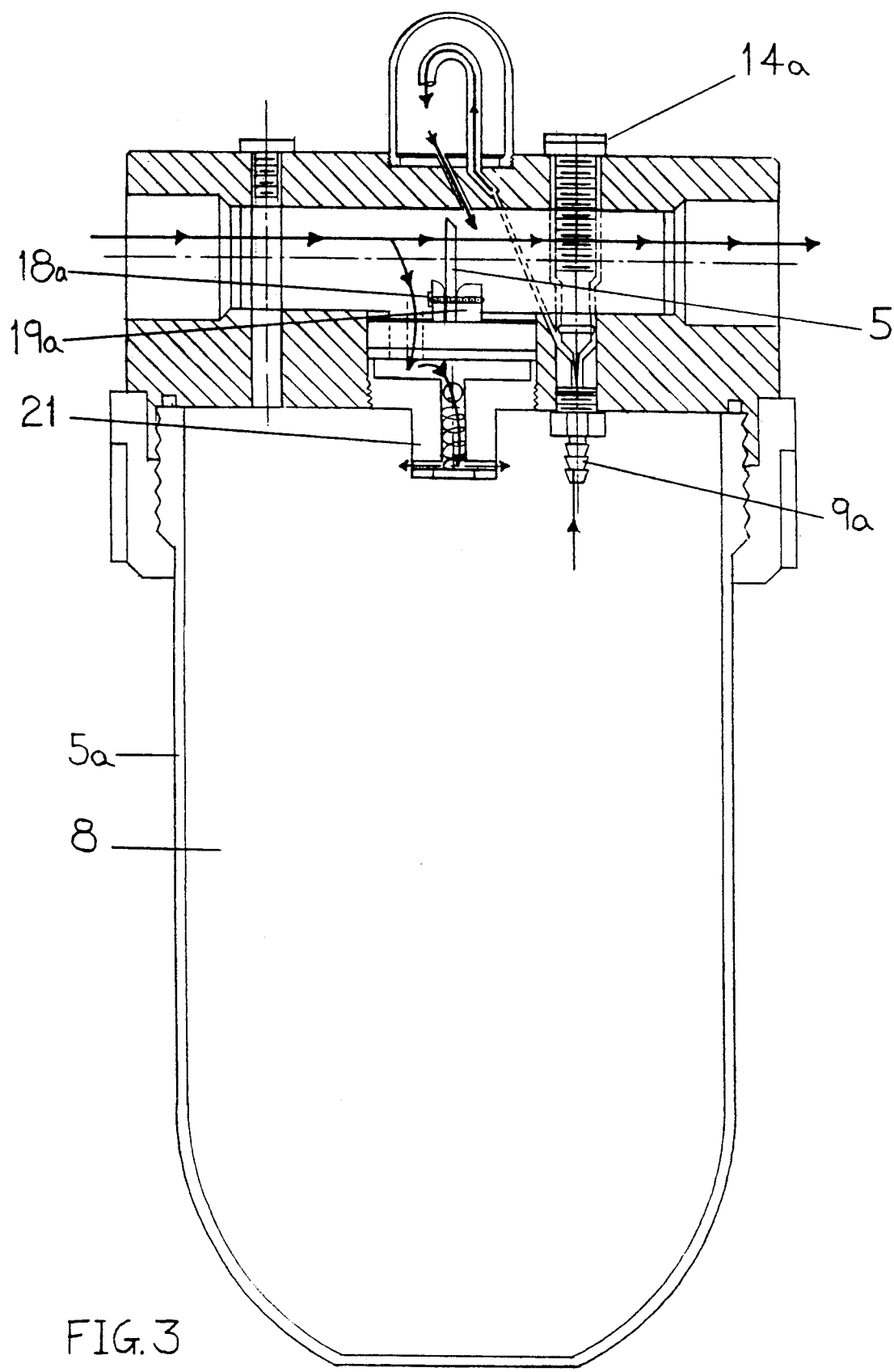
FIG. 3 depicts a cross-sectional view of the lubricator of FIGS. 1 and 2 after conversion to low water pressure dispensing unit.

Referring generally to FIGS. 1 and 2, depicted is an SMC Pneumatics Incorporated air lubricator model MAC400-03 which is typical of most air lubricators and is a preferred air lubricator on the market for the purposes of this invention. The SMC Pneumatic as with most air lubricators, comprises a casing 4 having an input port 1 and an output port 2, both in communication with one another via a channel 3. In the middle of the channel are venturi means 5 which can either consist of a constricted tube or a flap 5, as in the SMC lubricator shown, or having a sloped surface 20 facing the input port and forming a constricted gap 19, combination of both. The use of the flexible flap 5 is preferred to relieve pressure within the system in the event that an accidental overpressurization takes place. In the event of such an overpressurization, the flap will bend in accordance with the flow of fluid thereby widening the arperture and reducing the pressure. In front of the flap on the input side is a high pressure area 7 and behind it is a lower pressure area 13. The high pressure area is in fluid communication with the interior 8 of reservoir 5 a via a channel 6. In the normal operation of the air lubricator, the reservoir 5 a is filled with oil and air at high speed is injected into the input port 1 thereby coming in contact with the venturi flap 5 and thereby pressurizing the interior of the reservoir 8. This causes oil within the reservoir to travel up a tube 9 up through the casing 4 and into a J-tube 10, which is encased in a airtight dome 15. Oil going up through the J-tube drips down into the cavity 11 and is drawn down through a small conduit 12 into the low pressure area 13 of the air flap. The air is thus lubricated and exits out the output port 2. Also found on the SMC Pneumatic lubricator, not necessarily found on air lubricators in general, is a needle valve 14 for controlling the flow of oil into the J-tube 10, a shield 16 placed about the outer casing to guard workers against accidental explosion of the casing in the event of an accidental application of extremely high-pressure air, a pair of screws 18 bolting the flap to the flap mount 19a and a gasket 17 for sealing the junction between the flap mount and the casing so as to prevent direct communication between the high and low areas with one another.

In summary, it can be said that the typical air flow lubricator available on the market comprises a casing having an input port, an output port, a channel of communication between the two, venturi means within the channel to create a high pressure area and a low pressure area, a reservoir containing the fluid to be injected, the high pressure area being in communication with said reservoir and said reservoir being in communication with said low pressure area, such that the pressure differential will force the injection of the fluid in the reservoir into the air stream. Now it must be understood that I have discovered that a pneumatic lubricator unmodified is effective in injecting phosphates into a flow of water. However, the results are not particularly impressive. For the SMC Pneumatic Lubricator shown, water must pass through the conduit 3 at a rate no less than 0.96 liters per minute in order for any detectible amounts of phosphate injection to occur, even with the needle valve 14 in its full open position. Though this new application for an old device is sufficient for low pressure water systems, it is not sufficient for very low water pressure systems which would require lowering the minimum flow rate to somewhere less than half that amount per minute.

Most air flow lubricators, such as the Wilkerson Lubricator, are also usable but not preferred. The casings of these lubricators are of uncoated aluminum which, when dissolved in water as a salt, is thought to be linked to Alzheimer's disease. The interior of these casings must be protectively coated. The SMC Pneumatic Lubricator, however, is sold with its interior aluminum surfaces already coated with an epoxy resin.

The SMC Pneumatics lubricator, when fully modified in accordance with this invention, is shown in FIG. 2. The two most important modifications are the reversal of the flap 5 and the removal of the gasket 17. Removal of the gasket allows the flap mount 19 and flap mount base 21 to be bolted higher in the casing 4 by an amount equal to the width of the gasket—about one millimeter. Hence, the gap 19 becomes a millimeter smaller and increases the pressure differential across the flap 5. With the removal of the gasket above, the required minimum flow of water needed to induce injection of the contents of the reservoir is reduced from 0.96 liters/min to 0.64 liters/min. I reverse the flap 5 because of its sloped upper surface 20. The sloped surface has the effect of reducing turbulence in the fluid flow. By reversing the flap, resistance to the flow of water is remarkably increased to a surprising degree. With no other modifications, reversal of the flap alone brings the minimum flow rate down from 0.96 liters/min. to 0.36 liters/min. Both reversing the flap and removing the gasket results in a minimum flow rate of 0.24 liters/-min., almost a fourth of the flow rate required for an unmodified lubricator.

Another advantage I have found is that when water increases the flap flexes so that back pressure does not build up excessively, contrary to lubricators with a fixed oriface.

Finally, a number of changes must be made to the SMC Pneumatics Lubricator to insure longterm reliability. First, the adjustment needle valve is modified to a screw design to assure that there is no customer tampering. Secondly, the two steel screws 18 that are located inside the water input must be removed and replaced with brass or stainless steel screws. Thirdly, the reservoir is preferably a clear plastic reservoir 5*a* and the bowlguard 16 removed, though this is merely an option and not critical to the invention. Fourthly, any portions of the dispensing head where aluminum is exposed must be covered with epoxy resin. Small areas in the SMC Pnumatics Lubricator, generally in the area of screw-tapped portions, will have some small areas of aluminum exposed. Fifth, if a solid substance is to be dispensed, the interior tube 9 must be removed, thereby leaving just a small projecting portion 9*a*. The tube 9 must be removed since the preferred embodiment is to fill the reservoir 8 with a solid cake of anti-scaling material. Since a solid disolves more slowly than a liquid solution, the amount of scaling material injected is thereby reduced to about two parts per million. Lastly, as an option, the needle valve assembly 14 may be removed entirely and sealed with a cap 14*a*. This is not necessary, however.

I claim:

1. A method of dispensing a substance into a flow of water, comprising:

providing an air lubricator comprising a casing having an air input port, an air output port, a channel in fluid communication with said ports, flap means disposed within said channel for creating a high pressure region on a side of said flap means facing said input port and a low pressure region on the side of said flap means facing said output port, a reservoir for the holding of lubricant, said reservoir in fluid communication with said high and low pressure regions such that the pressure differential across said flap means formed by a flow of air will force the injection of a lubricant in said reservoir into an air stream;

filling said reservoir with the substance to be dispensed;

supplying means for receiving the flow of water into said input end;

supplying means for receiving the flow of water emanating from said output end;

supplying the flow of water at a rate sufficient to induce a pressure differential across said flap means of a degree effective in dispensing the substance into the flow of water.

2. The method of claim 1 wherein said flow of water is supplied at a rate no less than 0.96 liters/min.

3. The method of claim 2 further comprising:

replacing a set of screws holding the flap of material to the flap base with a set of screws made of a material resistant to water corrosion.

4. The method of claim 2 further comprising:

coating any aluminum surfaces in contact with said flow of water with an epoxy resin.

5. The method of claim 1 or 2 wherein said substance is a scaling inhibitor.

* * * * *